(12) United States Patent
Epstein

(10) Patent No.: US 6,925,182 B1
(45) Date of Patent: Aug. 2, 2005

(54) ADMINISTRATION AND UTILIZATION OF PRIVATE KEYS IN A NETWORKED ENVIRONMENT

(75) Inventor: Michael A. Epstein, Spring Valley, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 08/994,878

(22) Filed: Dec. 19, 1997

(51) Int. Cl.[7] .................................................. H04L 9/00
(52) U.S. Cl. ....................... 380/277; 380/282; 713/182; 713/186
(58) Field of Search ................................ 713/168, 171, 713/182, 186, 189, 193, 200, 201, 183, 184, 185; 380/277, 278, 281–282, 283–286, 21, 23, 25, 49, 279

(56) References Cited

U.S. PATENT DOCUMENTS

| 5,208,858 A | | 5/1993 | Vollert et al. | |
| 5,590,199 A | * | 12/1996 | Krajewski | 380/25 |
| 5,604,801 A | * | 2/1997 | Dolan et al. | 380/21 |
| 5,689,565 A | * | 11/1997 | Spies et al. | 713/189 |
| 5,732,137 A | * | 3/1998 | Aziz | 713/183 |
| 5,892,828 A | * | 4/1999 | Perlman | 380/25 |
| 5,903,882 A | * | 5/1999 | Asay et al. | 705/44 |
| 5,919,257 A | * | 7/1999 | Trostle | 713/200 |

FOREIGN PATENT DOCUMENTS

EP 0725512 A2 8/1996 .............. H04L/9/32

OTHER PUBLICATIONS

Applied Cryptography(Bruce Schneier, p. 174), Oct. 1996.*
Bruce Schneier, Applied Cryptography, pp. 38–39, Sep. 1996.*

* cited by examiner

Primary Examiner—Hosuk Song
(74) Attorney, Agent, or Firm—Gregory L. Thorne

(57) ABSTRACT

The private and public keys of users, as encrypted with a symmetric algorithm by using individual user identifying keys are stored at a network server, indexed or addressable by user ID, and are sent to the user equipment only when needed. The user identifying keys are determined by hashing the users' respective passphrases or biometric information. After use, the private key and user identifying key are not retained at the user equipment. The encrypted private key is transmitted via the network to the user equipment along with a document to be approved by the user (in the case where the private key is used for digital signature) and, at the user equipment, the received encrypted private key is decrypted using a key determined at the user equipment by hashing either the user's passphrase, which is entered by the user, or the user's biometric information which is obtained by measurement or scanning the user. The received document is modified or merely reviewed, and a digital signature signifying the user's approval, is formed as a hash of the approved document encrypted using the user's private key. The digital signature and document are transmitted to the server, where verification takes place.

6 Claims, 2 Drawing Sheets

ADMINISTRATION AND UTILIZATION OF PRIVATE KEYS IN A NETWORKED ENVIRONMENT

BACKGROUND OF THE INVENTION

1. Field of the Invention

The present invention relates to methods and systems utilizing private keys in a networked environment, and more particularly to administration of private keys of users in a manner that private keys are not retained permanently at user equipment.

2. Description of the Related Art

Public key cryptosystems in which a pair of a corresponding public key and a private (or secret) key is assigned for each user can be used in a variety of applications in a networked environment. In such applications, a private key can be used for encryption or for decryption solely by or on behalf of the assigned user. One use of a private key for encryption is to produce a digital signature of a digital document (for all purposes in this application the term "document" is intended to include any message, file, program or other data) on behalf of a user to manifest the user's modification, or review, and approval of the modified and/or reviewed document or otherwise indicate that the user is the source of the document (hereafter "approved document").

In accordance with such digital signature methods and systems, after the document is modified or reviewed, at the user's end a secure hash function (such as SHA-1 or RIPEMD) is applied to the document to extract a relatively short string, termed a "hash" or "hash result", which may be thought of as a "fingerprint" of the approved document, which hash, after encryption with an asymmetric algorithm (such as RSA or El Gamal) using the private key of the user, is sent to the recipient or server over the network along with or forming part of the document. At the receiving end the hash is calculated in two ways: (1) the encrypted hash of the document is decrypted with the asymmetric algorithm using the user's public key corresponding to the user's private key and (2) the same secure hash function is applied to the document; the signature is considered verified if the hashes calculated in these two ways match.

In such methods and systems, the user's private key may be maintained at the user's end stored in the user's personal workstation or mobile computer, e.g. notebook or handheld, or may be entered in some fashion by the user into shared equipment. In either case, the personal or shared equipment used is vulnerable to access or theft by a person of malevolent intent. Consequently, there is a significant risk that the user's private key could be extracted by such a person from the user equipment. On the other hand, using a token such as a smartcard to secure the private key at the user's end would necessitate the expense of equipping each user equipment with a reader for such a token.

One solution to this security problem is described in U.S. Pat. No. 5,208,858 wherein the private key is never extant at the user equipment. Therein, a hash of the approved document is sent from the user equipment to a central server which stores and administers users' private keys. At the server, the received hash is encrypted with the user's private key available at the server to form a digital signature which is combined with the user's public key and further data to form a so-called certificate which is transmitted to the user equipment for checking after the signature is decrypted at the user equipment using the user's public key. If the result of the user's checking is positive, the document and the signature-containing certificate may be sent directly from the user equipment to the desired recipients.

The method of U.S. Pat. No. 5,208,858 has the drawback of the need to send the digital signature back to the originator for checking and also that the server must be located in a highly secure place because the private keys are stored therein in the clear (or at least in a form from which they can be derived by the server). It should be noted that the consequences of a person of malevolent intent compromising the server and obtaining the stored private keys would be catastrophic, rendering unreliable all digital signatures made with the system at any time. Further, in this known method it appears that the server could be tricked by a block-replay attack or a man-in-the-middle attack into signing a document which did not originate from the user on behalf of whom the signature is made, or signing duplicates of documents that did originate from the user.

Other systems where the users do not permanently retain keys are known in which temporary keys, e.g. for symmetric encryption/decryption, are distributed to or agreed upon between users specifically for use only in a current session.

SUMMARY OF THE INVENTION

It is an object of the present invention to provide a method of administering and using private keys in which private keys of users are not retained on user equipment, but rather are transmitted to the user equipment in encrypted form via the network when needed.

It is a further object of the present invention to provide a method of and system for maintaining private keys of users at a centralized location, such as at a storage means accessible by a server, and for distributing keys to user equipment in a manner which is highly secure from extraction due to the form in which the keys are stored and transmitted.

Briefly, these and other objects are satisfied by methods and systems in which there is associated with each user a respective set of a private key, public key corresponding to the private key, ID, and a unique user identifying key which is obtainable only through interaction with a user that is physically present at the user equipment. The user identifying key may be a hash of user identifying information which is a fanciful but easily memorized series of words termed a "passphrase" entered by the user at the user equipment, or biometric information (e.g. fingerprint, voiceprint, retina scan, face scan) which is obtained from the user by suitable measurement or scanning at the user equipment. The private keys of users, as encrypted using the respective user identifying keys, are maintained in a storage means accessible to the server along with the users' respective public keys, indexed or addressable by user ID. The storage means and the network are extremely immune from extraction of private keys by unauthorized persons because the private keys are stored at the storage means and are transmitted over the network only in encrypted form. Further, the user identifying keys needed to decrypt them are not available at the storage means or at the server.

The operation of the systems and methods of the present invention generally begin with the transmission from user equipment, i.e. a station or terminal, of a user's ID via the network to the server. The server receives the transmitted ID and uses it to read from the storage means the user's encrypted private key and the user's public key. The encrypted private key is then transmitted via the network to the user equipment. When the the private keys are to be utilized for producing digital signatures, a document to be approved by the user after modification and/or review is also transmitted along with the encrypted private key.

Locally at the user equipment, the received encrypted private key is decrypted with the user identifying key which is obtained by hashing the user's passphrase, entered by the user, or hashing the user's biometric information, obtained by measurement or scanning of the user. The received document is modified, such as by filling in blanks, or merely reviewed, and a digital signature is formed to signify the user's approval of the modified and/or reviewed document, which signature represents a computed hash of the approved document encrypted using the user's private key. At least the encrypted hash constituting the digital signature of the approved document is transmitted to the server; the approved document is also transmitted in cases where it has been modified, rather than merely reviewed.

At the server the digital signature and the document, if sent, are received. A hash of the document is computed and compared with the result of decrypting the digital signature using the user's public key, and the received digital signature is verified if these items match each other.

From the point of view of the server, the present invention involves a novel method for administering private keys for use by a plurality of users via a network, comprising:

receiving via the network a user's ID;

reading from a storage means data corresponding to the user having the received ID, which data comprises the user's private key encrypted using a user identifying key determinable only from interaction with a physically present user, and the user's public key; and sending via the network the encrypted private key, whereby the first data can be decrypted at the location of the user using a user identifying key determined from interaction with the physically present user.

This method also comprises receiving a digital signature manifesting the user's approval of a document, which digital signature represents a computed hash of the approved document encrypted with the user's private key, and verifying the received digital signature by decrypting the digital signature using the user's public key and comparing the result of this decrypting with an independently computed hash of the document.

From the point of view of the user equipment, the present invention involves a novel method for obtaining and using a private key via a network, comprising:

transmitting from the user equipment an ID of a user;

receiving a private key of the user encrypted with a user identifying key; and decrypting the encrypted private key using a user identifying key determined from interaction with the physically present user; and using the encrypted private key; and destroying or avoiding making any non-volatile record of the private key at the location of the user.

This method also involves:

computing a hash of a document to manifest the user's approval of the document;

encrypting the hash using the user's private key; and transmitting the encrypted hash.

The present invention is also directed to a novel system for administering private keys for a plurality of users comprising computer readable storage means, characterized in that there is stored therein respective IDs and encrypted private keys for the respective users which private keys have been encrypted using respective user identifying keys determined from interaction with physically present users. The novel system additionally comprises a server for accessing the storage means, characterized in that the server is configured for reading from the storage means an encrypted private key and corresponding public key associated with an ID corresponding to a particular user, for transmitting the encrypted private key to the particular user. This novel system is additionally characterized in that the server is further configured for applying decryption to a digital signature received from the user using the public key, computing a hash of a document, and comparing the computed hash with the result of the decryption. Further, the novel system comprises at least one user terminal interconnected via a network to the server. and is characterized in that the user terminal is configured for transmitting to the server via the network an ID entered by the user, and for receiving and decrypting an encrypted private key received via the network from the server using a user identifying key determined as a result of the presence of the user at the user equipment.

Other objects, features and advantages of the present invention will become apparent upon perusal of the following detailed description when taken in conjunction with the appended drawing, wherein:

DETAILED DESCRIPTION OF THE PREFERRED EMBODIMENTS

It should be understood that while the present invention is discussed hereinafter in terms of an exemplary system and method for obtaining digitally signed documents of a plurality of users in a networked environment, the principles of the present invention are equally applicable to obtaining and verifying digital signatures of a variety of data, files, programs or other "documents", whether originated, modified or reviewed by users. In any event, the digital signature may be thought of as manifesting an approval by the user of a document. The principles of the invention are also equally applicable to various systems and methods requiring the administration of private keys for a plurality of users in a networked environment.

An important aspect of the present invention is that it employs user identifying keys for each user, for securing private keys. The user identifying keys can only be derived from user identifying information obtain by interaction with the user physically present at the user equipment. The user identifying information may be either a fanciful series of words, termed a passphrase, entered by a user or biometric information, such as a fingerprint, voiceprint, retina scan or face scan, obtained by measurement or scanning of the user.

It is very difficult to guess passphrases as opposed to passwords as there are many possible phrases. For example, a particularly good passphrase may concatenate two phrases which are in different languages. Guessing such a passphrase would be extremely difficult using normally available computer power. Also, biometric information is particularly unique and immune to a guessing attack.

Figure 1:
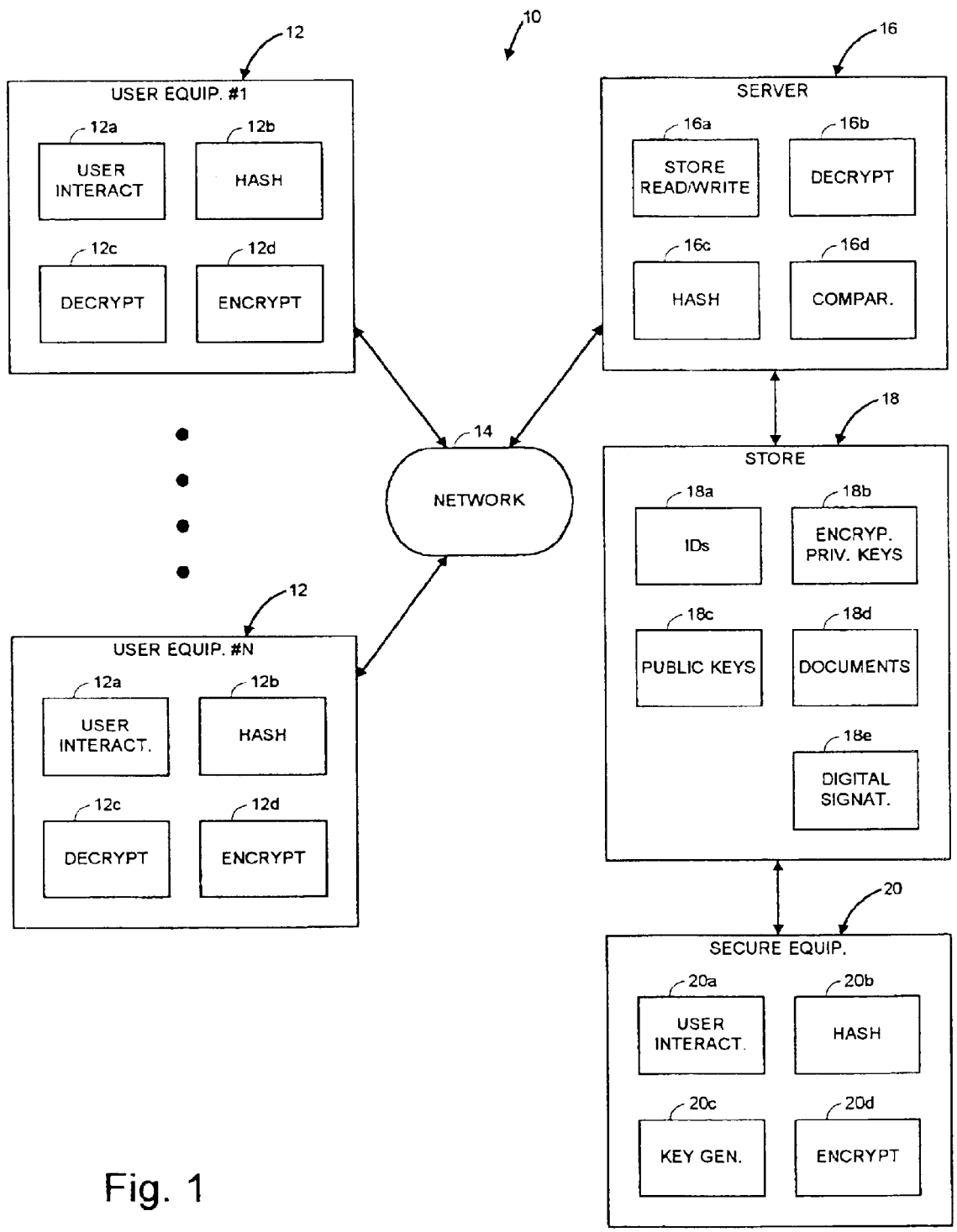
FIG. 1 is a schematic diagram of an exemplary system in accordance with the present invention for administering private keys for a plurality of users used for digitally signing documents, which system includes user equipment and a server.

Referring first to FIG. 1 of the drawing, there is shown a networked system 10 comprised of a plurality of computer stations, terminals or other user computing and/or communication equipment 12 and a server 16 interconnected or capable of communicating via a wired or wireless network 14. A store 18, which may be or include RAM, ROM, a hard disk, or other memory or media, is coupled to or forms part of server 16, and contains respective sections 18*a–e*, or fields in a data structure, for storing user IDs, encrypted private keys, public keys, documents, and digital signatures, respectively, for all users, which are indexed or otherwise addressable or retrievable by ID. Networked system 10 may take a variety of forms but is preferably an intranet, the network 14 supporting TCP/IP, the user equipment 14 employing web browsers, and the server 18 acting as a web server.

The public/private key pair for each user is preferably RSA, although these key pairs may be implemented pursuant to any public key cryptosystem including El Gamal, and those based on elliptic curve cryptography. The encryption/decryption algorithms employed in such systems are referred to as asymmetric, because different keys are employed for encryption and decryption.

The encrypted private keys stored in section or field 18b of the store 18 have been encrypted with a symmetric encryption/decryption algorithm (employing the same key for encryption and decryption) such as IDEA or DES using a user identifying key derived from the user's passphrase or biometric information. In order to construct the dataset of encrypted private keys, the user identifying keys have previously been obtained in an extremely secure way as a result of the presence of the respective users at secure equipment 20 coupled to store 18 or server 16. Secure equipment 20 comprises a user interaction means 20a and a hashing means 20b of the same form as the user interaction means 12a and hashing means 12b, respectively, of user equipment 12 (which will be described hereinafter), a key generator 20c for generating public key/private key pairs, and an encryption means for encrypting a generated private key with a user identifying key.

At the secure equipment 20, using the user interaction means 20a each passphrase was entered by the respective user or biometric information obtained by measuring or scanning the respective user in front of the system administrator (to confirm the user's identity) when the user was assigned a private key generated by key generator 20c, but any passphrase entered or biometric information obtained was not viewed by or accessible to the administrator. The entered passphrase or obtained biometric information was then immediately hashed by hashing means 20b with a secure hash function (SHA-1 or RIPEMD) to form a fixed length user identifying key, of suitable length such as 160 bits if SHA-1 is used, which was immediately used by encryption means 20c to encrypt the assigned private key with the symmetric algorithm, after which all traces of the entered passphrase or obtained biometric information, and the hash thereof were cleaned from the secure equipment 20. Also, the IDs and public keys for each user in sections or fields 18a and 18c, respectively have been obtained or assigned at the same time.

User equipment 12 includes: input interaction means 12a such as a mouse and/or keyboard, handwriting recognition, voice recognition or other input means for obtaining an ID and, if used, a passphrase from a user, and for a user to fill in a document, and for biometric measurement or scanning, if used, to obtain biometric information (fingerprint, voiceprint, retina scan, face scan) from a user; a hashing means for applying a secure hash function (SHA-1 or RIPEMD) to an entered passphrase or obtained biometric information, and to an approved document; a symmetric decryption means 12c for decrypting an encrypted private key received from server 16 using the hashed passphrase or biometric information as a user identifying key; and an asymmetric encryption means 12d for encrypting a hash of the approved document using the secret key to form a digital signature. The various hashing, encryption, and decryption means may be implemented by software running on a CPU (not shown) of user equipment 12 or by special purpose hardware.

Server 16 comprises: means 16a for reading from and writing to the store 18; means 16b for performing an asymmetric decryption of a digital signature received from a user using the public key of the user read from section or field 18c; hashing means 16c for performing a secure hash function to form a hash of a received approved document; and comparison means 16d for comparing the result of decrypting the digital signature with the result of hashing the approved document. The decryption, hash, and comparison means 16b–16d together form a verification means and may also be implemented by software running on a CPU (not shown) of server 16, or by specialized hardware.

Figure 2:
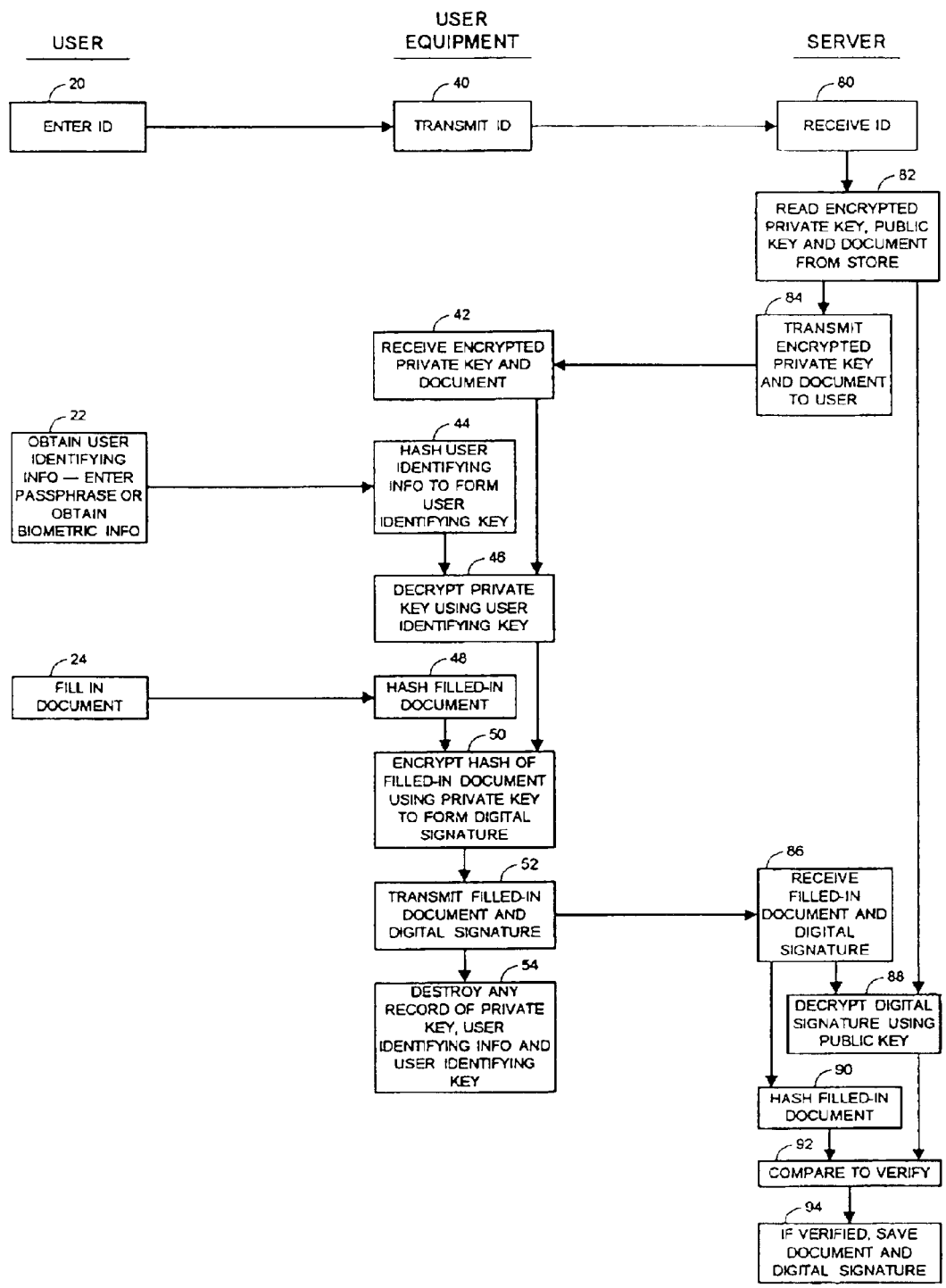
FIG. 2 is a data flow chart which indicates in separate columns the method steps performed by the user, the user equipment, and the server in operation of the system of FIG. 2.

The operation of the networked system 10 in obtaining digital signatures of documents will be best understood with reference to FIG. 2, which shows the operations performed by user interaction, by the user equipment 12, and by the server 16 in different columns. In this Figure, it is assumed that the user has already requested access to the document system (home page) and the server 16 has sent a sign-in page to the user equipment 12. Thereafter at step 20, the user enters his ID in the sign-in page via input means 12a, e.g. the initials of the user, providing the IDs of all users are unique, and at step 40 the sign-in page including the entered ID is transmitted to the server, which receives it at step 80. In response, at step 82 the server 16, using the received ID as an index, reads from store 18 the corresponding encrypted secret key, public key, and a blank (or already partially or completely filled-in) document; the latter may contain information specific to the user, such as the user's full name. The document and encrypted secret key are transmitted by server 16 at step 84 to user equipment 12, where they are received at step 42 and presented to the user for example as a form constructed by a Java applet. In order to prevent a man-in-the-middle attack on user equipment 12, the applet should be signed in a known manner by server 16 and verified at the user equipment using a public key of the server which is certified by a certificate of a trusted authority.

If not previously entered in the current session, the user enters his passphrase or his biometric information is measured or scanned at step 22 via user interaction means 12a, to obtain user identifying information which is hashed at step 44 to a fixed length, e.g. 160 bits if SHA-1 is used, by hashing means 12b to form the user identifying key, and at step 46 the user identifying key is used by decryption means 12c to decrypt the received encrypted private key. Also, at step 24 (which may precede or succeed step 22) the user fills in the document via user interaction means 12a, and at step 48, the filled-in document is hashed by hashing means 12b to a fixed length, e.g. 160 bits.

Then, at step 50, the hash of the filled-in document is encrypted by encryption means 12d using the recovered private key to form a digital signature, and at step 52, the filled-in document and digital signature are sent to server 16. Lastly, at user equipment 12, in step 54, any record of the recovered secret key, the entered passphrase or obtained biometric information, or its hash, are all erased or destroyed (or, alternatively, a non-volatile record is never made) so they cannot be obtained from the user equipment.

At step 86 the server receives the filled-in document and the digital signature and goes through steps 88, 90 and 92 to verify the digital signature in a known manner before executing step 94, wherein the filled-in document and digital signature are stored in sections or fields 18d, 18e of store 18 as a substantially permanent record. The verification steps include step 88 invoking decryption means 16b to decrypt the digital signature using the public key of the user, and step 90 invoking the hashing means 16c to form a hash of the received filled-in document using the same secure hash function as used by the user equipment in step 48. In step 92 the comparison means 16d is invoked to compare the results of steps 88 and 90. It should be apparent that verification occurs if the hash of the document obtained by decrypting the digital signature agrees with an independently computed or available hash of the document.

It should also be appreciated that the objects of the present invention have been satisfied and that the present invention provides a moderately secure protocol for digital signatures in a networked environment such as an intranet system which can only be compromised by a passphrase or biometric information guessing attack, which is fairly hard, or by failure of a major encryption algorithm (e.g. RSA, IDEA).

While the present invention has been described in particular detail, it should also be appreciated that numerous modifications are possible within the intended spirit and scope of the invention. For example, the present invention is equally applicable to systems where IDs do not have to be entered by users because they may be retained at user equipment, to systems where documents are originated at user equipment, and to systems where documents transmitted from the server are merely reviewed and not modified or completed at the user equipment. In the latter, the documents or their hashes may be independently available to the server, without the necessity to transmit them from the user equipment.

What is claimed is:

1. A method for obtaining and using a private key at user equipment via a network, said method comprising:
   transmitting from the user equipment an ID of a user;
   receiving ecrypted private key of the user that is encrypted with a user identifying key associated with the user;
   interacting with the user at the user equipment to determine the user identifying key; and
   decrypting the encrypted private key using the user identifying key to obtain a decrypted private key, using the decrypted private key, and
   destroying all copies of the encrypted private key and all copies of the decrypted private key at the location of the user.

2. The method of claim 1, wherein
   interacting with the user includes obtaining a passphrase from the user.

3. A method as claimed in claim 1, wherein
   using the decrypted private key includes:
      computing a hash of a document to manifest the user's approval of the document;
      encrypting the hash using the users private key; and
      transmitting the encrypted bash.

4. A method as claimed in claim 2, wherein
   using the decrypted private key includes:
      computing a hash of a document to manifest the user's approval of the document;
      encrypting the hash using the user's private key; and
      transmitting the encrypted hash.

5. The method of claim 1, wherein
   interacting with the user includes obtaining biometric information from the user.

6. The method of claim 5, wherein
   using the decrypted private key includes:
      computing a hash of a document to manifest the user's approval of the document;
      encrypting the hash using the user's private key; and
      transmitting the encrypted hash.

* * * * *